Aug. 14, 1928.　　　　　　　　　　　　　　　1,680,975
D. R. FRANCIS
HAND WHEEL AND LOCKING DEVICE FOR SPEED GEARS
Filed March 2, 1927　　　2 Sheets-Sheet 1
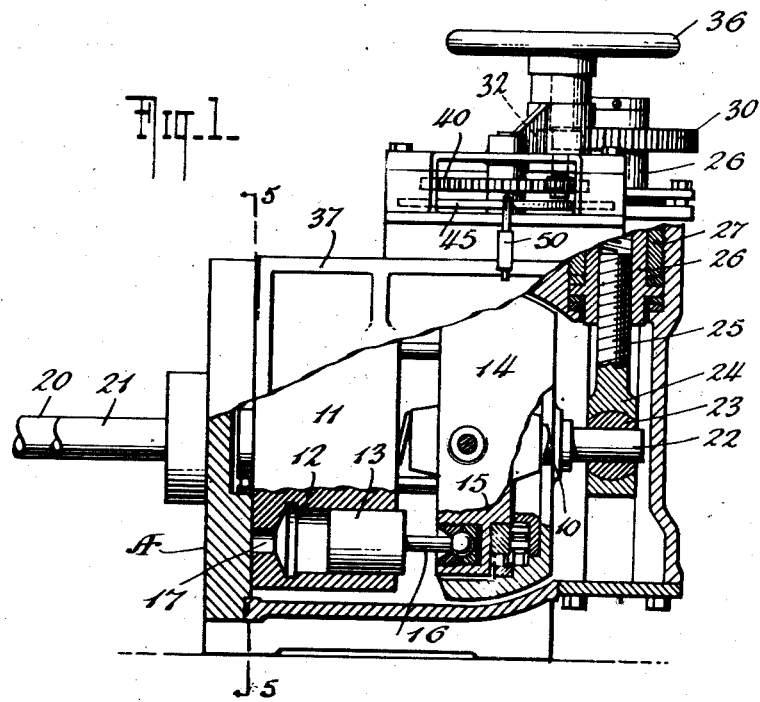
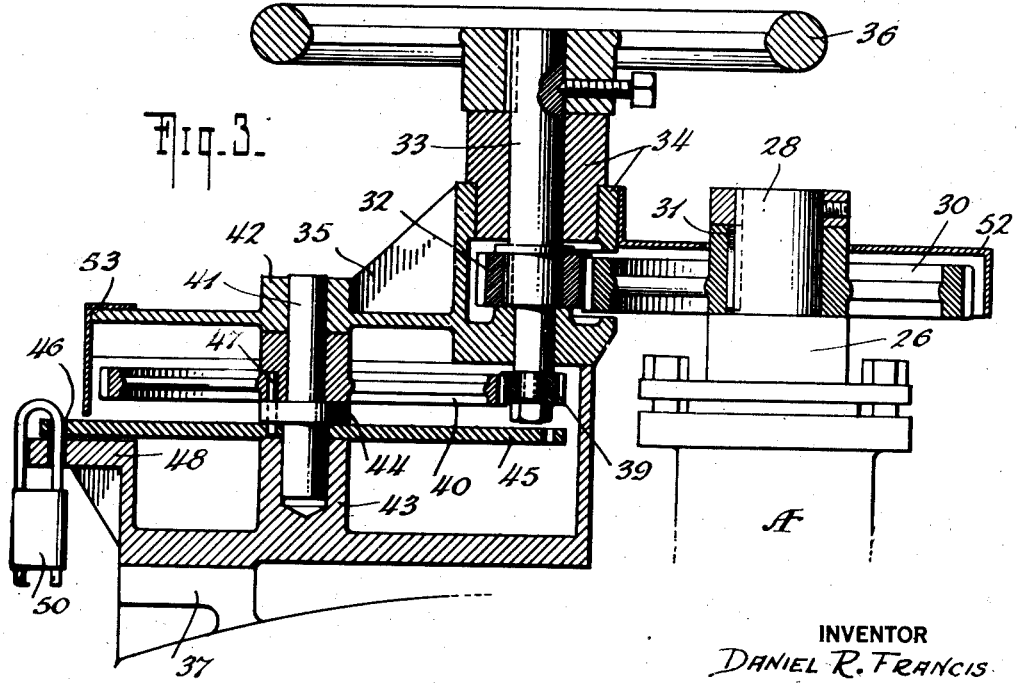
INVENTOR
DANIEL R. FRANCIS
BY
ATTORNEYS

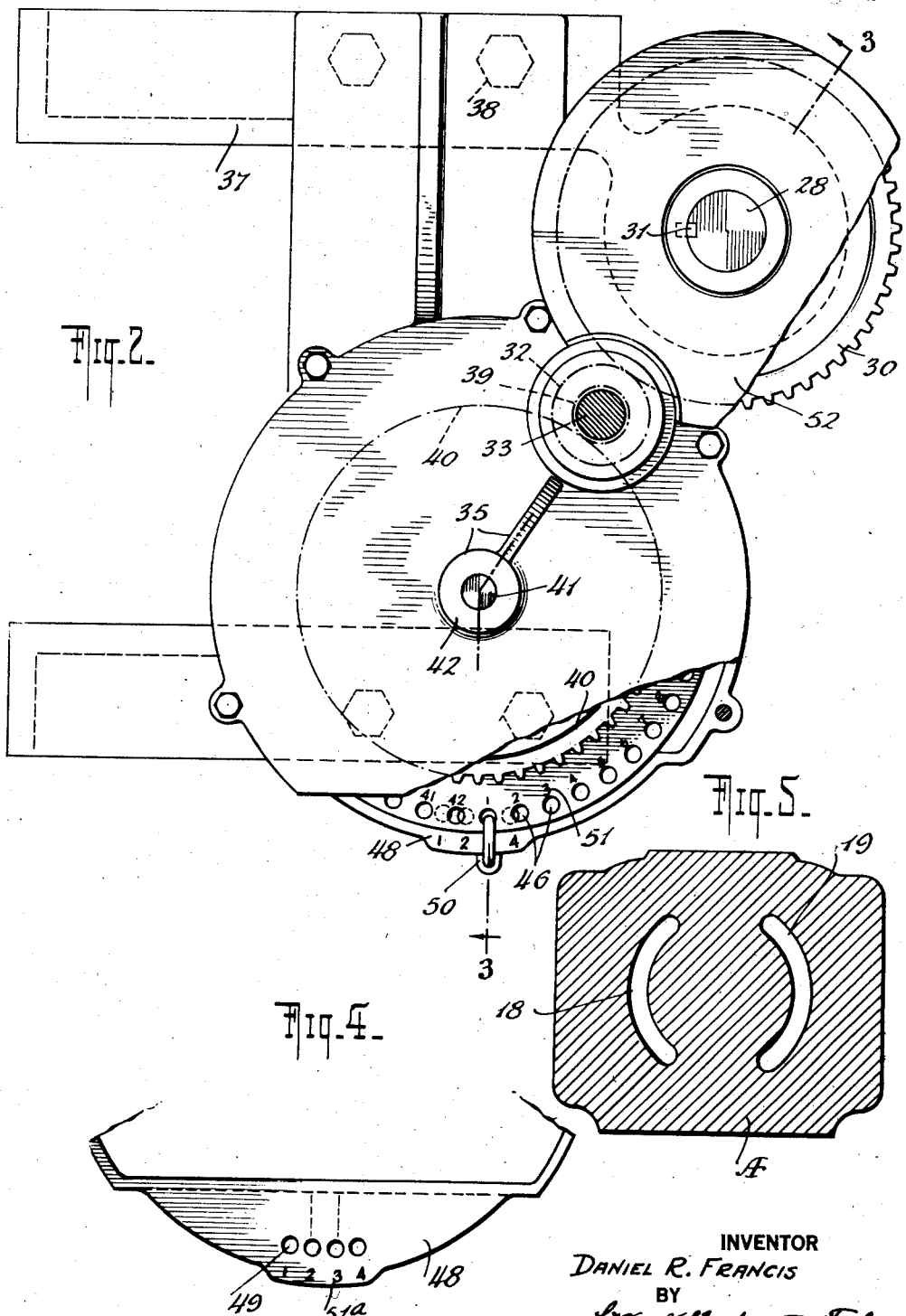

Patented Aug. 14, 1928.

1,680,975

UNITED STATES PATENT OFFICE.

DANIEL R. FRANCIS, OF WATERBURY, CONNECTICUT, ASSIGNOR TO THE WATERBURY TOOL COMPANY, OF WATERBURY, CONNECTICUT, A CORPORATION OF CONNECTICUT.

HANDWHEEL AND LOCKING DEVICE FOR SPEED GEARS.

Application filed March 2, 1927. Serial No. 171,940.

This invention relates to hydraulic speed gears of the type disclosed in Letters Patent of the United States granted to Harvey D. Williams on June 15, 1909, No. 925,148 and on November 18, 1912, No. 1,044,838.

The invention has particular utility in connection with machines, in which it is necessary to produce relatively slow changes for accurately controlling the speed of the machine so as to secure a uniform product.

In certain machines, for example, wire rope stranding and paper making machines, the speed of the machine is in important factor which contributes to impart certain desired definite predetermined characteristics to the final product, and it is of the utmost importance that such characteristics will vary but slightly above or below certain standards. The use of hydraulic speed gears for such machines has many advantages because of the fact that gradual speed changes may be secured by such gears without sudden or abrupt variations such as occur with spur or similar change-speed gear trains. It has been found, however, that it is difficult to secure a fine enough adjustment of the speed by moving directly the control shaft of the well known hydraulic speed gears of the type disclosed in the above mentioned patents. It has also been found desirable to insure that when the machine has been set to run at the proper speed for any particular job, it will not be tampered with, or the speed adjustment thereof changed except by the particular person to whom such duty is assigned.

The principal object of this invenion is to provide a new and improved construction for a hydraulic gear of the type referred to, by means of which a very slight adjustment of the control shaft may be made readily and thereby small variations of the speed secured.

A further object is to provide a new and improved construction by means of which the gear may be securely locked in its adjusted position.

These and other objects will be more readily understood by reference to the following specification and to the accompanying drawings forming a part hereof.

In the drawings, Fig. 1 is a side elevation, partly in section, of a portion of hydraulic speed gear embodying the principles of my invention; Fig. 2 is a plan view; Fig. 3 is a section on the line 3—3 of Fig. 2; Fig. 4 is a plan view of a constructional detail of the locking means, and Fig. 5 is a sectional detail of the hydraulic gear taken on the line 5—5 of Fig. 1.

As shown in Fig. 1 of the drawings, the reference character A indicates a pump, or as it is commonly called the A-end of a hydraulic speed gear, of the type shown in the patents to Williams above referred to. The shaft 10 of the pump which may be driven by any suitable means, such as an electric motor, is suitably journalled in the pump casing and has secured to rotate with it a barrel 11. Formed within the barrel 11, is a plurality of cylinders 12 in which pistons 13 are adapted to reciprocate. The stroke of these pistons, and consequently the amount of fluid pumped for each rotation of the shaft 10 and barrel 11, depends upon the inclination of a box 14, in which is rotatably mounted a swash plate 15; said swash plate being connected with the pistons 13 by the piston rods 16. As the shaft 10 is rotated and the pistons are caused to reciprocate, said pistons suck or force oil to the cylinder ports 17 which are adapted to align alternately, as the barrel 11 rotates, with the arcuate ports 18, 19 (see Fig. 5) formed in the end of the pump casing. One of said arcuate ports, for example, the port 18 is the pressure port and the other is the suction port. These arcuate ports are connected by means of the pipes 20 and 21 with a motor (not shown) the construction of which is similar to that of the pump. It will be understood that the motor is connected by any suitable means with the machine to be driven.

The construction of pump-motor combinations of this character is well known and in such combinations, the passage of the fluid under pressure from the pump, to and through the motors, produces in the latter, the reciprocation of pistons similar to the pistons 13, thereby causing the rotation of the barrel and driven shaft of the motor by means of the connection of the motor pistons with an inclined rotatably mounted swash plate, similar to the swash plate 15. In accordance with the usual practice, the swash plate of the motors are preferably held at a fixed angle, while the inclination of the swash plate of the pump is variable.

For the purpose of varying the inclination of the box 14 and swash plate 15, the box 14 is provided with a lateral projection in the form of a stub axle or pin 22, which is slidably mounted in a central aperture, provided in a spherical bearing 23, rotatable within a similarly shaped seat in a bearing block 24, formed on the lower end of a screw threaded rod or spindle 25; said bearing block 24 being guided for vertical movement in suitable guide ways, formed on the inner wall of the pump casing. The spindle 25 engages within the internally threaded lower end of a control shaft 26, mounted for rotation, but held against longitudinal movement within a flanged collar 27, secured to the pump casing. The control shaft 26, projects outwardly beyond the collar 27 and has its outer end 28 reduced and preferably provided with a key way. Suitable packing is provided to prevent leakage of the oil around the control shaft 26. As will be readily understood, rotation of the control shaft 26 will cause the spindle 25 and bearing block 24 to be moved upwardly or downwardly, according to the direction of rotation of the shaft thereby to move the box 14, through the bearing block 24, bearing 23 and stub axle 22, to change the inclination of said box and vary the stroke of the pistons 13.

In order that a very slight adjustment of the control shaft may be made readily, and thereby small variations of speed secured, I provide a reduction gearing for actuating such control shaft. A suitable constructional example of such a gearing as shown in the accompanying drawings, consists of a large spur gear 30, keyed as by the key 31, to the reduced outer end 28, of the control shaft 26. Meshing with the spur gear 30 is a spur pinion 32, secured to a hand wheel shaft 33, rotatably mounted in a bearing 34, provided in a bracket 35, said shaft carrying a hand wheel 36 upon its upper end. The pump casing is provided with flanges 37 to which the bracket 35 is secured by means of the bolts 38.

For the purpose of locking the control shaft in its adjusted position the following means are provided: The hand wheel shaft 33 projects downwardly below the spur pinion 32 and carries at its lower end a small spur pinion 39, which meshes with a large spur gear 40, mounted on a jack shaft 41, the upper end of which is rotatably mounted in a bearing 42, provided in a horizontally extending web of the bracket 35. The jack shaft 41 has its lower end rotatably mounted within a bearing 43 also provided in the bracket 35 and spaced below and in axial alignment with the bearing 42. Between its ends the jack shaft is provided with a collar-like enlargement 44 upon which the spur gear 40 rests. Located between the enlargement 44 of the jack shaft and the lower bearing 43, is a disk or plate 45 having adjacent to its outer periphery a series of equally spaced holes 46. The spur gear 40, collar-like enlargement 44 and the disk 45 are secured together to rotate in unison by means of a pin 47.

The bracket 35 is provided at one side with a horizontally extending flange 48, located immediately below the plate 45, but projecting slightly beyond the periphery of said plate. A plurality of equally spaced holes 49 are provided in the flange 48, the centers of said holes being located the same distance radially from the axis of the jack shaft as the centers of the holes 46 so that the holes 46 may be located in vertical alignment with the holes 49. A padlock 50, or similar locking device, may thus be engaged within an aligned pair of the holes 46 and 49 to lock the plate 46, hand wheel 36 and control shaft 26, against rotation in a manner which will be readily understood. The spacing of the holes 49, it will be noted is different from the spacing of the holes 46, thereby enabling a vernier adjustment of the plate 46, hand wheel 36 and control shaft 26 to be obtained.

For convenience in setting the control shaft to a desired position and as a ready means for determining whether or not the setting of the control shaft has been tampered with, suitable indicia 51 and 51ª are provided upon the plate 46 and flange 48 respectively. Suitable guards, or housings, 52 and 53 of sheet metal are preferably provided for the gears 30 and 40, respectively.

The operation of the device, as will be readily understood, is as follows: Because of the large gear reduction provided by the spur gear 30 and pinion 32, a relatively large amount of movement of the hand wheel 36 will produce but a small rotation of the control shaft 26. The gear reductions between the control shaft 26 and the hand wheel shaft 33, and between the latter and the plate 45, may obviously be selected so that any desired predetermined mathematical relationship will exist between the movement of the plate 46, and the corresponding movement produced by the hand wheel 35 of the control shaft. As will be readily understood, the provision of the series of holes 49 differently spaced than the holes 46, enables the device to be locked in different set positions corresponding to but very slight changes in speed over the entire speed range of the hydraulic gear.

I claim:

1. The combination with a hydraulic speed gear, having a swash plate adapted to be moved to different inclined positions to vary the effective speed of said gear, a control shaft, and connections between said control shaft and swash plate for changing the angle of inclination of the latter, of an attachment for said gear comprising a bracket, a manually operable control member and a reduction gearing carried by said bracket and interposed between said member and control shaft, for causing a relatively large movement of said member to produce a slight movement of said control shaft.

2. The combination with a hydraulic speed gear comprising a pump casing, a swash plate adapted to be moved to different inclined positions to vary the effective speed of said gear, a control shaft, and connections between said control shaft and swash plate for changing the angle of inclination of the latter, of a bracket secured to said pump casing, a shaft journalled in said bracket, a hand wheel secured to said shaft, and a reduction gear between said shaft and said control shaft, for causing a relatively large movement of said hand wheel to produce a slight movement of said control shaft.

3. The combination with a hydraulic speed gear, having a swash plate adapted to be moved to different inclined positions to vary the effective speed of said gear, a control shaft, and connections between said control shaft and swash plate for changing the angle of inclination of the latter, of a bracket secured to said gear a manually operable control member mounted in said bracket, a reduction gearing interposed between said member and control shaft, for causing a relatively large movement of said member to produce a slight movement of said control shaft, a locking plate operatively associated with said control member and having a plurality of spaced holes therein, and a stationary part adjacent to said locking plate having one or more holes with which the holes of said locking plate may be aligned for the reception of a locking member.

4. The combination with a hydraulic speed gear, having a swash plate adapted to be moved to different inclined positions to vary the effective speed of said gear, a control shaft, and connections between said control shaft and swash plate for changing the angle of inclination of the latter, of a bracket mounted on said gear, a hand wheel shaft journalled in said bracket, a pair of pinions secured to said hand wheel, a gear secured to said control shaft and meshing with one of said pinions, a jack shaft and a gear secured thereto meshing with the other of said pinions, a locking plate mounted on said jack shaft, and means to cause said jack shaft, said last named gear, and said plate to be rotated in unison by the rotation of said other pinion, said locking plate having a plurality of holes therein for the reception of a locking device and a stationary member provided with means with which said locking device may be engaged to lock said plate, said shafts and gears against rotation.

In testimony whereof I have hereunto set my hand.

DANIEL R. FRANCIS.